United States Patent
Schulze et al.

(10) Patent No.: US 11,820,120 B2
(45) Date of Patent: Nov. 21, 2023

(54) DAMPING ELEMENT

(71) Applicant: ADLER PELZER HOLDING GMBH, Hagen (DE)

(72) Inventors: Volkmar Schulze, Schierling (DE); Volker Kursch, Essen (DE); Maurizio Tarello, Caluso (IT)

(73) Assignee: ADLER PELZER HOLDING GMBH, Hagen (DE)

( * ) Notice: Subject to any disclaimer, the term of this patent is extended or adjusted under 35 U.S.C. 154(b) by 76 days.

(21) Appl. No.: 17/608,435

(22) PCT Filed: Apr. 30, 2020

(86) PCT No.: PCT/EP2020/062116
§ 371 (c)(1),
(2) Date: Nov. 2, 2021

(87) PCT Pub. No.: WO2020/225126
PCT Pub. Date: Nov. 12, 2020

(65) Prior Publication Data
US 2022/0194049 A1    Jun. 23, 2022

(30) Foreign Application Priority Data
May 3, 2019    (DE) .......................... 102019111464.0

(51) Int. Cl.
*B32B 5/24*    (2006.01)
*B32B 3/04*    (2006.01)
(Continued)

(52) U.S. Cl.
CPC ................ *B32B 5/245* (2013.01); *B32B 3/04* (2013.01); *B32B 5/022* (2013.01); *B32B 5/18* (2013.01);
(Continued)

(58) Field of Classification Search
CPC .......... B32B 5/245; B32B 3/04; B32B 5/022; B32B 5/18; B32B 2250/03; B32B 2250/40; B32B 2255/02; B32B 2255/205; B32B 2262/0261; B32B 2262/0276; B32B 2266/0278; B32B 2307/102; B32B 2307/212; B60K 1/04; B60K 2001/0438
See application file for complete search history.

(56) References Cited

U.S. PATENT DOCUMENTS 10,476,061 B1    11/2019    Groebl
2006/0137936 A1*    6/2006    Schulze .................. B32B 5/022
                                                181/290

(Continued)

FOREIGN PATENT DOCUMENTS

DE    102014018538 A1    6/2016
EP    1164646 A1    12/2001
WO    2016146840 A1    9/2016

OTHER PUBLICATIONS

Search Report dated Jul. 23, 2020 in corresponding International Application No. PCT/EP2020/062116, translated, 5 pages.

*Primary Examiner* — Brian Handville
(74) *Attorney, Agent, or Firm* — MH2 TECHNOLOGY LAW GROUP LLP

(57) ABSTRACT

A damping element for a battery/accumulator system is arranged between the battery/battery system and a floor of a motor vehicle.

6 Claims, 2 Drawing Sheets

Figure 1:
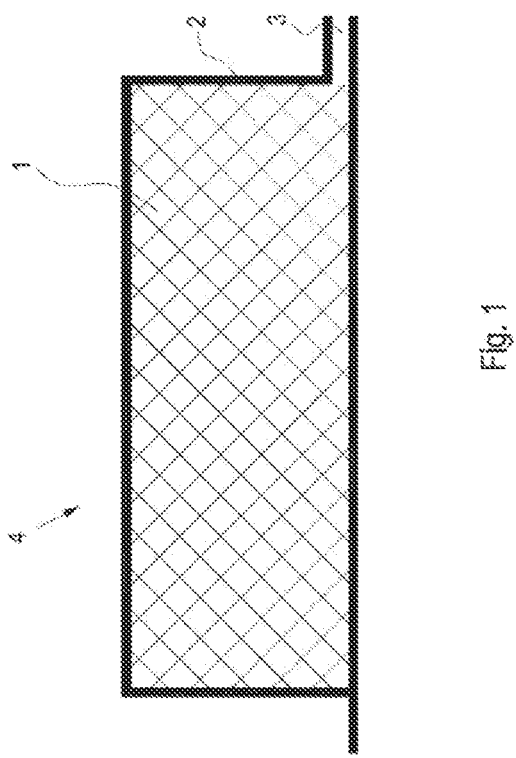

(51) Int. Cl.
  *B32B 5/02* (2006.01)
  *B32B 5/18* (2006.01)
  *B60K 1/04* (2019.01)

(52) U.S. Cl.
  CPC ............ B60K 1/04 (2013.01); *B32B 2250/03* (2013.01); *B32B 2250/40* (2013.01); *B32B 2255/02* (2013.01); *B32B 2255/205* (2013.01); *B32B 2262/0261* (2013.01); *B32B 2262/0276* (2013.01); *B32B 2266/0278* (2013.01); *B32B 2307/102* (2013.01); *B32B 2307/212* (2013.01); *B32B 2307/3065* (2013.01); *B32B 2307/51* (2013.01); *B32B 2307/56* (2013.01); *B32B 2307/718* (2013.01); *B32B 2307/72* (2013.01); *B32B 2307/732* (2013.01); *B32B 2457/10* (2013.01); *B32B 2605/08* (2013.01); *B60K 2001/0438* (2013.01)

(56) References Cited

U.S. PATENT DOCUMENTS

| | | |
|---|---|---|
| 2012/0160583 A1 | 6/2012 | Rawlinson |
| 2013/0153317 A1 | 6/2013 | Rawlinson et al. |
| 2018/0281577 A1* | 10/2018 | Acikgoez .............. H01M 50/24 |
| 2021/0376405 A1* | 12/2021 | Browning ............. B32B 19/041 |

* cited by examiner

DAMPING ELEMENT

CROSS-REFERENCE TO RELATED APPLICATIONS

This application is a National Stage of PCT/EP2020/062116 filed Apr. 30, 2020, pending, which claims priority to German Application No. DE 10 2019 111 464.0, filed May 3, 2019, the entire disclosures of which are hereby incorporated by reference.

The object of the invention is to provide a damping element arranged between the battery/battery system and the floor of the motor vehicle.

DE 10 2016 207 231 A1 is known in the prior art. This discloses an arrangement of an electrical high-voltage energy storage device on a motor vehicle, in which the high-voltage energy storage device is arranged in the region of an underbody of the motor vehicle and is at least partially covered at the bottom in the upward direction of the vehicle by a floor element, at least one load distribution element being arranged in a gap arranged in the upward direction of the vehicle between the high-voltage energy storage device and the floor element, via which load distribution element the floor element can be supported on the high-voltage energy storage device.

The load distribution element is a deformation foam and/or at least one spring element, in particular a spring rail. This arrangement is intended to protect the high-voltage energy storage device against collision. The deformation foam is in particular a metal foam.

Furthermore, battery coatings, for example made of metal-coated foam, have been proposed in the prior art to keep the battery warm. However, the battery does not really get warm during operation, so that the cover cannot store any heat. In any case, it can serve as cold insulation.

The task of the present invention compared to the aforementioned prior art is thus to provide a (vibration) damping element, in particular for electric vehicles, which is arranged between the battery/accumulator system and the motor vehicle floor and couples the mass of the battery/accumulator system to the motor vehicle floor and reduces/dampens the sheet metal vibrations. In motor vehicles in which the battery/accumulator system is arranged vertically to/against the front wall (front or rear), the damping element according to the invention is also used.

In a first embodiment, the object of the present invention is a damping element 4 for a battery/accumulator system, in particular of an electric vehicle, comprising a viscoelastic PUR foam 1 with (a) a density in the range 20 to 65 kg/m³,
(b) a loss factor greater than 0.2,
(c) which meets, in particular, the burning behaviour requirements specified by the OEM,
(d) wherein the foam 1 is covered over its entire surface with a nonwoven 2,
(e) the nonwoven 2 is coated on the side facing away from the foam 1,
(f) has vent openings 3 in the cover seam, the cover bend and/or in the cover lip;
(g) and this damping element 4 is arranged in a compressed manner in the range from 25 to 75% between the battery/battery system and the motor vehicle floor of an electric vehicle.

No damping elements are known in the prior art which, by inserting a constrained (compressed) foam 1—which is covered in a corrosion-protected manner—between the car body sheet metal and the battery system, effect a coupling of the battery mass to the car body sheet metal and thus a vibration damping of the floor sheet metal.

Viscoelastic in the sense of the present invention means a partially elastic, partially viscous material behaviour. The elastic portion basically causes a spontaneous, limited reversible deformation, while the viscous portion causes a delayed (time-dependent) recovery behaviour after pressure deformation; and thus the viscoelastic foam 1 exhibits good damping properties.

The initial thickness of the foam 1 is determined by the gap between the car body sheet metal and the battery/accumulator system; the initial foam thickness is in the range of 8 to 30 mm, preferably up to 10 and 20 mm.

The nonwoven, which may be coated with copper or aluminium and optionally with an anti-corrosion layer, in particular on one side, is predominantly a polyester or polyamide spunbond nonwoven which is also or simultaneously suitable for shielding electromagnetic radiation.

Thus, the core of the present invention is to provide a damping element 4 which couples the mass of the battery/accumulator system to the vehicle floor, is corrosion resistant and, if necessary, simultaneously shields electromagnetic radiation and reduces/dampens sheet metal vibrations.

The advantage of the present invention is that by means of precisely the damping element 4, the sheet metal vibrations are reduced and damped, and thus the weight per area of commercially available anti-drumming foils can be reduced or dispensed with, and thus the overall weight of the vehicle can be reduced.

A measure of the burning behaviour of the foam 1 is determined, for example, by the flammability. DIN 75200 was developed from the American standard FMVSS 302 (Federal Motor Vehicle Safety Standard). The test procedures are practically identical; DIN 75200 merely describes the test setup and the performance of the burning test as well as the determination of the burning rate, while FMVSS 302 additionally specifies assessment criteria. The standards were developed to test the burning behaviour of materials for vehicle interiors.

EXAMPLE OF EMBODIMENT

A damping element consisting of a commercially available viscoelastic PUR foam 1 (density 35 kg/m³, loss factor 0.4, thickness 20 mm, flammability fulfilling FMVSS 302) was covered with a chemically bonded polyamide spunbond nonwoven (80 g/m², coating: copper+corrosion protection layer). Vent openings 3 were arranged in the cover bow. This damping element 4 was then arranged between the motor vehicle floor and the battery system of a passenger car. The degree of compression of the foam 1 was 40%.

Figure 2:
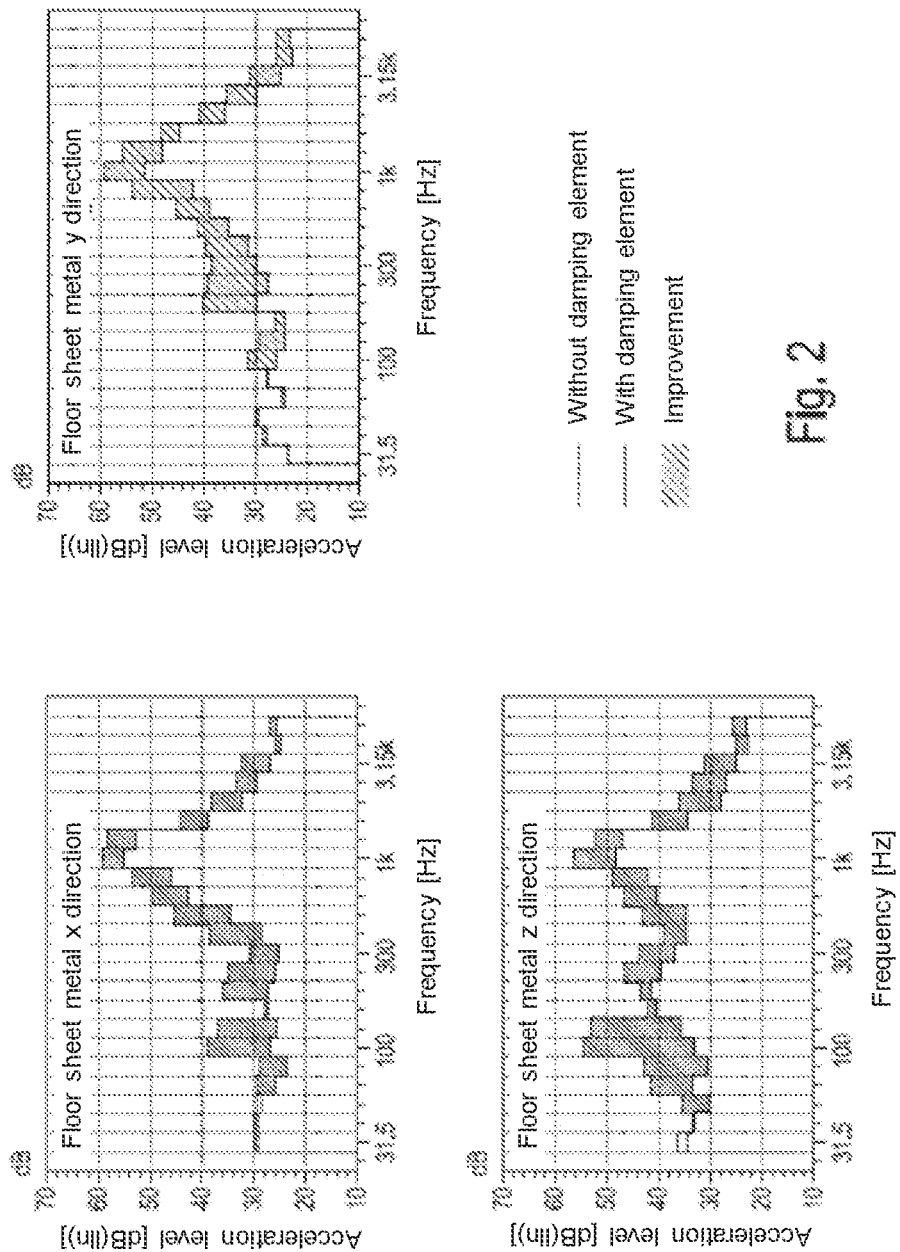

FIG. 2 shows the acoustic efficiency when the passenger car is travelling at a constant speed of 80 km/h. The diagrams show the acceleration levels of the car body sheet metal measured on the passenger compartment side with and without the damping element. The diagrams show the acceleration levels of the car body sheet metal I measured on the passenger compartment side when driving at a constant speed of 80 km/h on the road with and without the damping element. In all three measured spatial directions, a significant improvement/level reduction is caused by the damping element.

The invention claimed is:

1. Damping element (4) for a battery/accumulator system of an electric vehicle, comprising a viscoelastic, covered PUR foam (1) comprising:

(a) a density in the range 20 to 65 kg/m³,
(b) a loss factor greater than 0.2,
(c) which meets the burning behavior requirements specified by the OEM,
(d) the foam (1) being covered over its entire surface with a nonwoven (2),
(e) the nonwoven (2) is coated on the side facing away from the foam (1),
(f) has vent openings (3) in a cover seam, a cover bend and/or in a cover lip; and
(g) the damping element (4) is arranged in a compressed manner in the range from 25 to 75% relative to an unpressed thickness of the foam between the battery/battery system and the motor vehicle floor of an electric vehicle.

2. The damping element (4) according to claim 1, wherein the nonwoven (2) covering the foam (1) has a copper or aluminium coating.

3. The damping element (4) according to claim 1, wherein the unpressed initial thickness of the foam (1) is determined by the gap between the car body sheet metal and the battery/accumulator system.

4. The damping element according to claim 1, wherein the initial unpressed thickness of the foam is in the range of 8 to 30 mm.

5. The damping element according to claim 4, wherein the initial unpressed thickness of the foam is in the range of 10 to 20 mm.

6. The damping element according to claim 2, wherein the nonwoven (2) coving the foam (1) has an anti-corrosion layer.

* * * * *